(12) United States Patent
Perveiler et al.

(10) Patent No.: US 8,516,791 B2
(45) Date of Patent: Aug. 27, 2013

(54) METHODS AND APPARATUS FOR MIXING FLUID IN TURBINE ENGINES

(75) Inventors: David Andrew Perveiler, West Chester, OH (US); Malcolm Kenneth MacLean, Mason, OH (US); Ross Michael Leon, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 900 days.

(21) Appl. No.: 11/965,304

(22) Filed: Dec. 27, 2007

(65) Prior Publication Data

US 2010/0043386 A1   Feb. 25, 2010

Related U.S. Application Data

(63) Continuation-in-part of application No. 11/830,341, filed on Jul. 30, 2007.

(51) Int. Cl.
F02K 99/00 (2009.01)

(52) U.S. Cl.
USPC .......................................... 60/262; 60/226.1

(58) Field of Classification Search
USPC ................ 60/266, 262, 770, 226.1; 181/213; 415/179, 176, 178
See application file for complete search history.

(56) References Cited

U.S. PATENT DOCUMENTS

| | | | |
|---|---|---|---|
| 3,842,597 A * | 10/1974 | Ehrich | 60/226.1 |
| 4,176,969 A | 12/1979 | Wallace et al. | |
| 4,815,531 A | 3/1989 | Presz, Jr. et al. | |
| 4,819,425 A | 4/1989 | Farquhar et al. | |
| 5,203,163 A | 4/1993 | Parsons | |
| 5,269,133 A | 12/1993 | Wallace | |
| 5,269,135 A | 12/1993 | Vermejan et al. | |
| 5,555,933 A | 9/1996 | Darragh et al. | |
| 6,058,696 A * | 5/2000 | Nikkanen et al. | 60/226.1 |
| 6,106,229 A | 8/2000 | Nikkanen et al. | |
| 6,212,871 B1 | 4/2001 | Rakhmailov | |
| 6,363,708 B1 | 4/2002 | Rakhmailov | |

(Continued)

FOREIGN PATENT DOCUMENTS

| | | |
|---|---|---|
| EP | 0275813 B1 | 2/1991 |
| EP | 0469827 A1 | 2/1992 |

(Continued)

OTHER PUBLICATIONS

JP Office Action dated Aug. 28, 2012 for co-pending JP patent application No. JP 2008-138813 (TPO Ref. No. TPO-5879).

(Continued)

*Primary Examiner* — Phutthiwat Wongwian
*Assistant Examiner* — Vikansha Dwivedi
(74) *Attorney, Agent, or Firm* — General Electric Company; David J. Clement; William J. Zychlewicz

(57) ABSTRACT

A method of assembling a gas turbine engine is provided. The method includes providing at least one heat exchanger assembly including a heat exchanger and a mixer extending downstream from the heat exchanger. The mixer includes a plurality of windows formed therein. The method also includes coupling the at least one heat exchanger assembly within a bypass duct of the engine such that the at least one heat exchanger assembly is coupled to at least one of an outer engine casing and an inner engine casing of the turbine engine.

20 Claims, 5 Drawing Sheets

(56) References Cited

U.S. PATENT DOCUMENTS

| | | | |
|---|---|---|---|
| 6,460,324 B1 | 10/2002 | Rakhmailov | |
| 6,494,031 B2 | 12/2002 | Takehara | |
| 6,510,894 B1 | 1/2003 | Watton et al. | |
| 6,736,201 B2 | 5/2004 | Watton et al. | |
| 7,000,404 B2 | 2/2006 | Palmisano et al. | |
| 7,213,391 B2 * | 5/2007 | Jones | 60/226.1 |
| 7,254,937 B2 | 8/2007 | Hull et al. | |
| 7,377,098 B2 | 5/2008 | Walker et al. | |
| 7,861,512 B2 * | 1/2011 | Olver et al. | 60/226.1 |
| 7,886,520 B2 * | 2/2011 | Stretton et al. | 60/266 |
| 2003/0079870 A1 | 5/2003 | Watton et al. | |
| 2005/0022502 A1 * | 2/2005 | Katheder | 60/262 |
| 2005/0144974 A1 | 7/2005 | Flinner et al. | |
| 2005/0252193 A1 * | 11/2005 | Iya et al. | 60/204 |
| 2006/0042223 A1 | 3/2006 | Walker et al. | |
| 2008/0012798 A1 * | 1/2008 | Shim et al. | 345/68 |
| 2008/0053060 A1 * | 3/2008 | Olver | 60/226.1 |

FOREIGN PATENT DOCUMENTS

| | | |
|---|---|---|
| EP | 1630358 A2 | 3/2006 |
| JP | 63194193 A | 8/1988 |
| JP | 4234536 A | 8/1992 |
| JP | 2006063980 A | 3/2006 |

OTHER PUBLICATIONS

JP Office Action dated Aug. 28, 2012 for co-pending JP patent application No. JP 2008-138813 (TPO Ref. No. TPO-5884).

* cited by examiner

METHODS AND APPARATUS FOR MIXING FLUID IN TURBINE ENGINES

CROSS REFERENCE TO RELATED APPLICATIONS

This application is a continuation-in-part of and claims priority to U.S. patent application Ser. No. 11/830,341 filed Jul. 30, 2007, which is herein incorporated in its entirety.

STATEMENT REGARDING FEDERALLY SPONSORED RESEARCH & DEVELOPMENT

The U.S. Government has certain rights in this invention as provided for by the terms of Contract No. N00019-96-C-0176.

BACKGROUND OF THE INVENTION

This invention relates generally to turbine engines, and more particularly, to heat exchangers used with turbine engines.

At least some known turbine engines include an inlet, a fan assembly, low and high pressure compressors, a combustor, and at least one turbine. Air entering such engines through the inlet is compressed by the fan assembly. In such engines, a portion of the compressed air is channeled through a bypass duct defined generally between an outer engine casing and an inner engine casing. At least some known turbine engines position a heat exchanger within the bypass duct to enable a flow of bypass air to be used by a thermal management system, such as for a heat sink. Specifically, in known engines, a thermal management system provides cooling to various systems that may generate heat by transferring heat from a cooling fluid channeled through the heat exchanger to bypass airflow channeled past the heat exchanger.

At least some known heat exchangers use an inlet scoop to facilitate entraining a sufficient amount of bypass air into the heat exchanger for cooling the various heat-generating systems. However, such heat exchangers may cause undesirable pressure losses in the bypass airflow. In addition, generally such heat exchangers also generate a flow of hot air, or a temperature streak, downstream from the heat exchanger. The flow of hot air and the reduced bypass airflow pressure may adversely reduce the performance and/or efficiency of the turbine engine.

BRIEF DESCRIPTION OF THE INVENTION

In one aspect, a method of assembling a gas turbine engine is provided. The method includes providing at least one heat exchanger assembly including a heat exchanger and a mixer extending downstream from the heat exchanger. The mixer includes a plurality of windows formed therein. The method also includes coupling the at least one heat exchanger assembly within a bypass duct of the engine such that the at least one heat exchanger assembly is coupled to at least one of an outer engine casing and an inner engine casing of the turbine engine.

In another aspect, a heat exchanger assembly for use in a turbine engine is provided. The heat exchanger assembly includes at least one core heat exchanger and a mixer extending downstream from the at least one core heat exchanger. The mixer includes a plurality of windows formed therein.

In a further aspect, a gas turbine engine is provided. The engine includes an outer casing, an inner casing, and a bypass duct defined therebetween. At least one heat exchanger assembly is coupled within the bypass duct to at least one of the outer casing and the inner casing. A mixer is coupled to the at least one heat exchanger. The mixer includes a plurality of windows formed therein.

DETAILED DESCRIPTION OF THE INVENTION

The present invention generally provides exemplary apparatus and methods to facilitate mixing bypass airflow in a gas turbine engine. The embodiments described herein are not limiting, but rather are exemplary only. It should be understood that the present invention may apply to any type of heat exchanger wherein an entrained fluid channeled through a heat exchanger is used to facilitate heat transfer with a fluid channeled past the heat exchanger.

Figure 1:
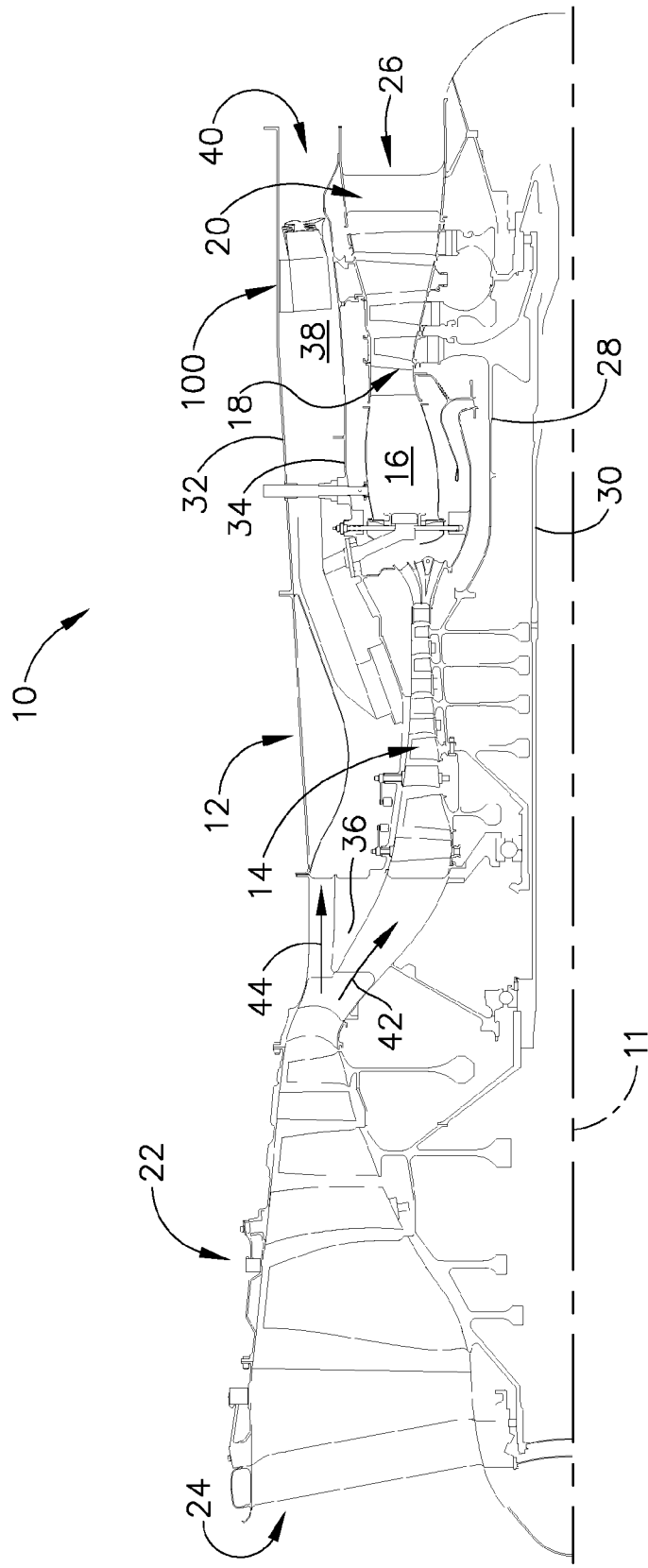
FIG. 1 is a schematic cross-sectional view of an exemplary turbine engine.

FIG. 1 is a cross-sectional view of a portion of an exemplary turbine engine assembly 10 having a longitudinal axis 11. In the exemplary embodiment, turbine engine assembly 10 includes a core gas turbine engine 12 that includes a high-pressure compressor 14, a combustor 16, and a high-pressure turbine 18. Engine assembly 10 also includes a low-pressure turbine 20 that is positioned axially downstream from core gas turbine engine 12, and a fan assembly 22 that is positioned axially upstream from core gas turbine engine 12. High-pressure turbine 18 and high-pressure compressor 14 are coupled together by a first shaft 28. Low-pressure turbine 20 and fan assembly 22 are coupled together by a second shaft 30. Engine assembly 10 also includes an intake side 24 and an exhaust side 26.

In the exemplary embodiment, engine assembly 10 also includes an outer casing 32 which is radially-spaced from an inner casing 34 including a forward section 36. Outer casing 32 and inner casing 34 define a bypass duct 38. Moreover, at least one heat exchanger assembly 100 is coupled within bypass duct 38. More specifically, in the exemplary embodiment, engine assembly 10 includes four heat exchanger assemblies 100 that are each circumferentially-spaced within bypass duct 38. Alternatively, engine assembly 10 may include any number of heat exchanger assemblies 100 that enables engine assembly 10 to function as described herein.

During operation, air entering engine assembly 10 through intake side 24 is compressed by fan assembly 22. The flow of compressed air exiting fan assembly 22 is split such that a first airflow portion 42 is channeled into core turbine engine 12 and a second airflow portion, or bypass air 44, is channeled through bypass duct 38. First airflow portion 42 is further compressed by high-pressure compressor 14 and is channeled to combustor 16. Airflow discharged from combustor 16 drives rotating turbines 18 and 20 prior to being discharged from engine 10 through exhaust side 26.

Figure 2:
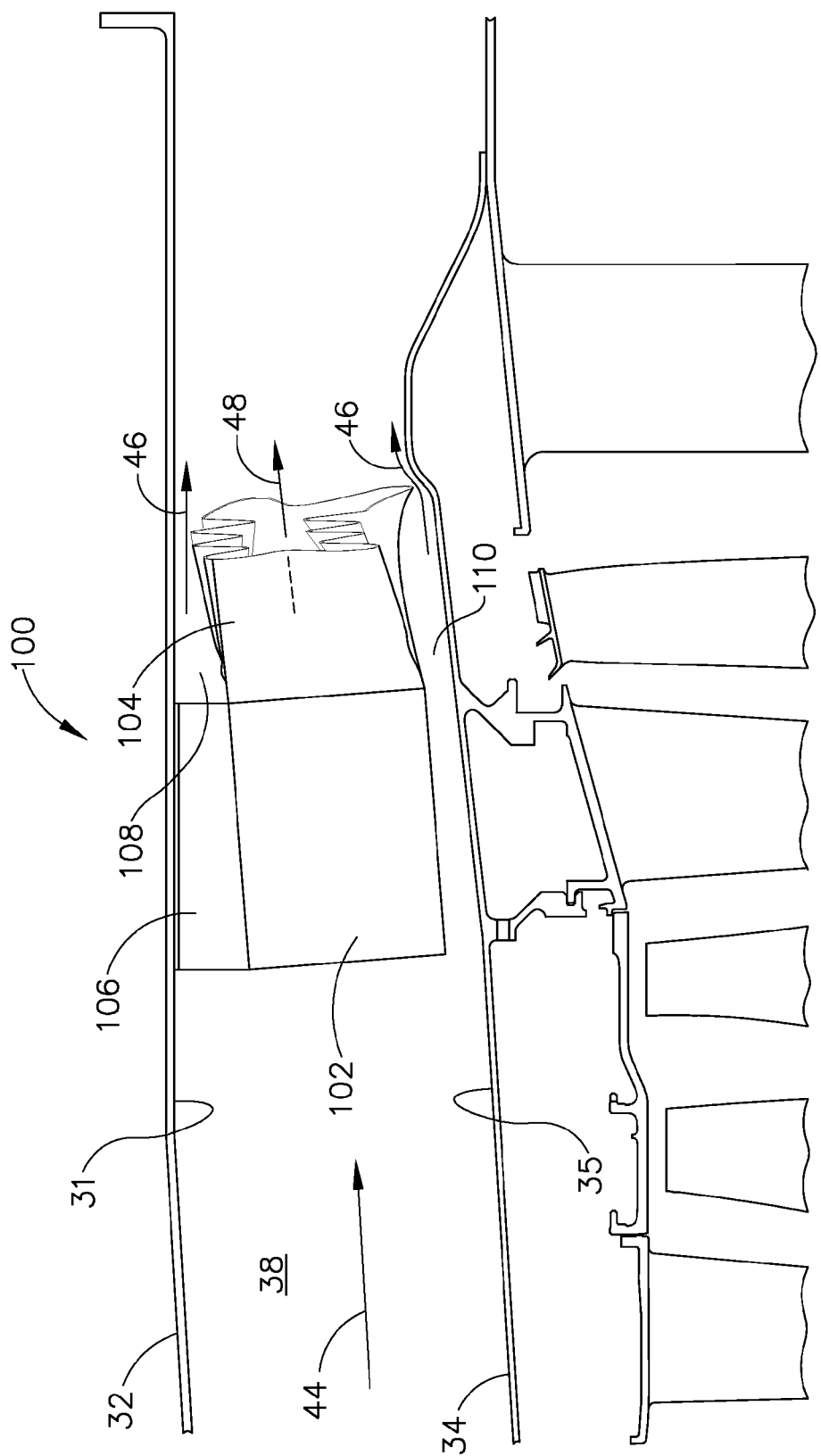
FIG. 2 is a schematic cross-sectional view of an exemplary heat exchanger assembly that may be used with the turbine engine shown in FIG. 1.
Figure 3:
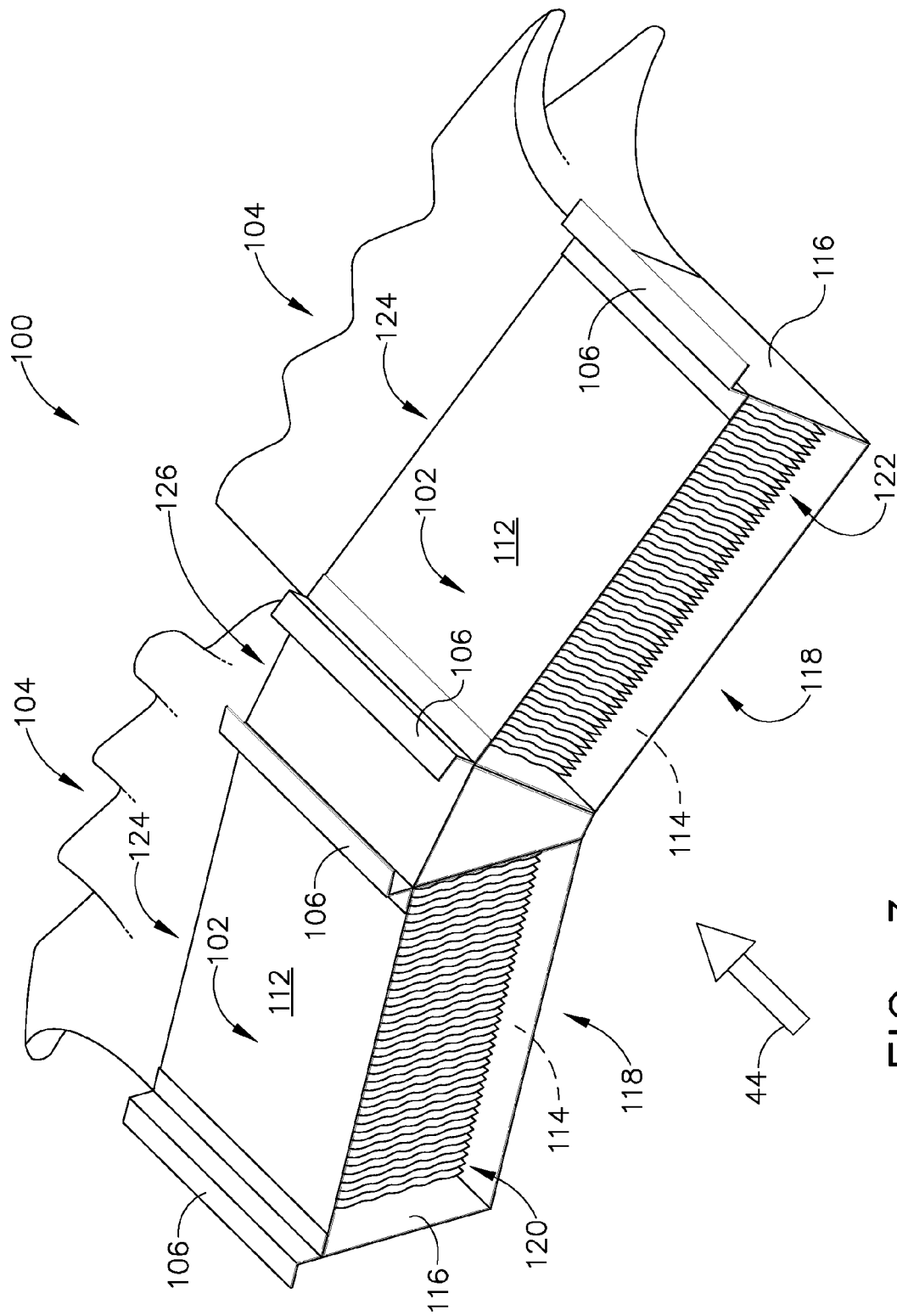
FIG. 3 is a forward perspective view of the heat exchanger assembly shown in FIG. 2.
Figure 4:
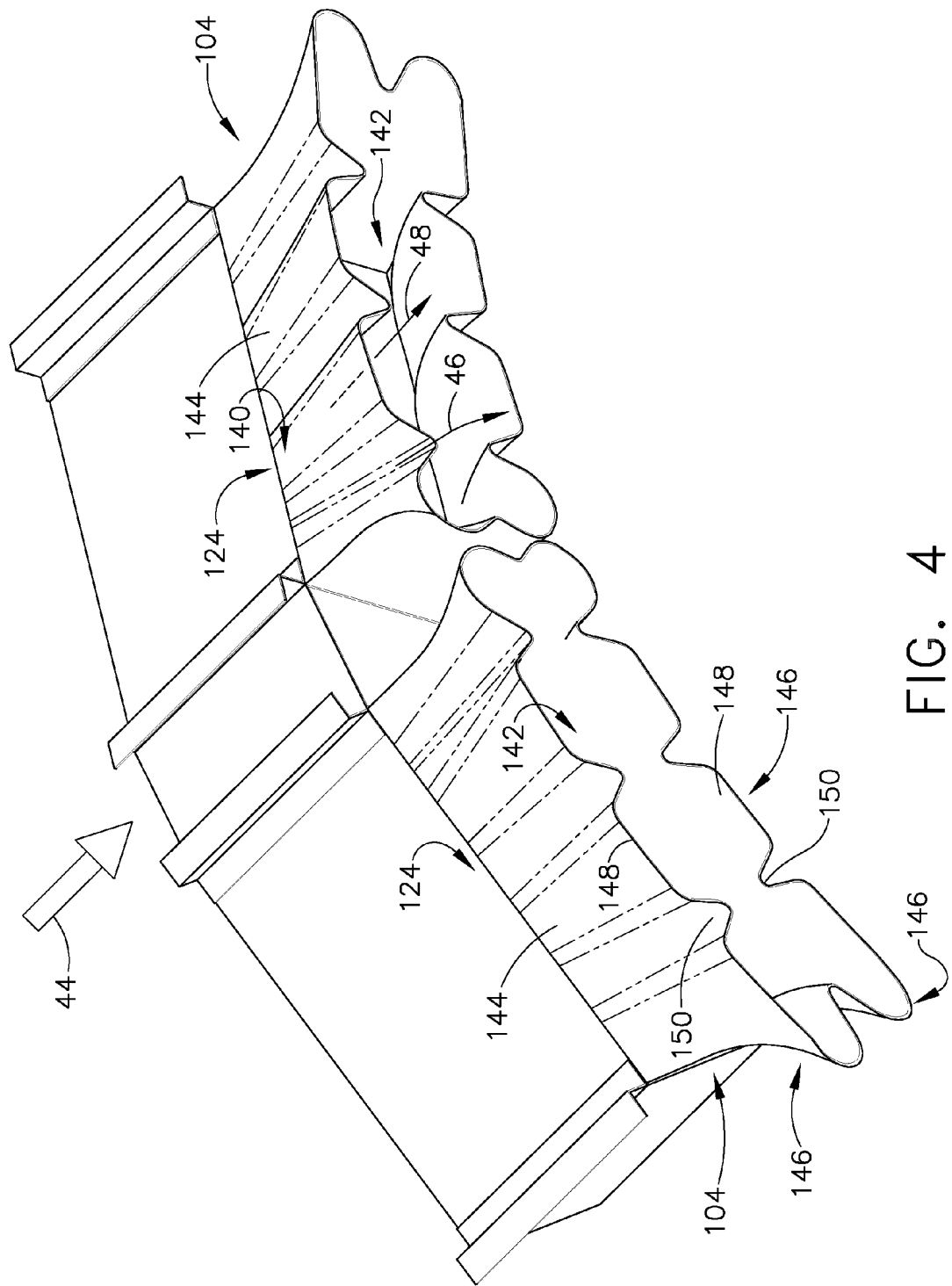
FIG. 4 is an aft perspective view of the heat exchanger assembly shown in FIG. 2.

FIG. 2 is a schematic cross-sectional view of heat exchanger assembly 100. FIG. 3 is a forward perspective view of heat exchanger assembly 100. FIG. 4 is an aft perspective view of heat exchanger assembly 100. In the exemplary embodiment, each heat exchanger assembly 100 includes a pair of core heat exchangers 102 that each includes a lobed mixer 104 extending downstream therefrom. Alternatively, each heat exchanger assembly 100 may include only one core heat exchanger 102 or more than two core heat exchangers 102. Each heat exchanger assembly 100, in the exemplary embodiment, is coupled to a radially inner surface 31 of outer casing 32 using at least one mounting bracket 106 extending from heat exchanger assembly 100. As a result, each heat exchanger assembly 100 is coupled within bypass duct 38 such that each core heat exchanger 102 is positioned in flow communication with a flow of bypass air 44 within bypass duct 38. Alternatively, heat exchanger assembly 100 maybe coupled to a radially outer surface 35 of inner casing 34. In the exemplary embodiment, heat exchanger assembly 100 is spaced between surfaces 31 and 35 such that a radially outer gap 108 is defined between inner surface 31 and heat exchanger assembly 100, and such that a radially inner gap 110 is defined between outer surface 35 and heat exchanger assembly 100.

Bypass air 44 is channeled generally axially downstream through bypass duct 38 and past heat exchanger assembly 100. Heat exchanger assembly 100 causes bypass air 44 to be split into a first flow of bypass air and a second flow of bypass air. Specifically, in the exemplary embodiment, the first flow of bypass air, or cold bypass air 46, is channeled past heat exchanger assembly 100, and the second flow of bypass air is channeled through heat exchanger assembly 100 such that a flow of hot bypass air 48 is discharged therefrom.

In the exemplary embodiment, each heat exchanger assembly 100 is coupled in communication to a thermal management system (not shown). The thermal management system utilizes bypass air 44 as a heat sink to facilitate cooling heat-generating systems and components of an associated aircraft (not shown) and/or engine 10. Such heat-generating systems may include, but are not limited to only including, aircraft electrical systems, engine cooling systems, and/or cockpit air-conditioning systems. In the exemplary embodiment, as described in more detail below, heat exchanger assembly 100 facilitates transferring heat from a cooling fluid channeled therethrough to the flow of bypass air 44. As a result, the temperature of the cooling fluid is reduced and hot bypass air 48 is discharged from heat exchanger assembly 100.

In the exemplary embodiment, each core heat exchanger 102 is substantially rectangular and includes an inner cavity 120 defined therein. Alternatively, each core heat exchanger 102 may have any shape that is suitable for use within bypass duct 38. In the exemplary embodiment, each core heat exchanger 102 includes a radially outer panel 112, a radially inner panel 114, and a pair of side panels 116 extending between panels 112 and 114. Panels 112, 114, and 116 are coupled together to define cavity 120 therein. Each core heat exchanger 102 also includes cooling tubes (not shown) coupled within cavity 120 to channel cooling fluid therethrough. A plurality of heat transfer fins 122 extend substantially radially inward from inner panel 114 towards outer panel 112, wherein fins 122 are coupled to the cooling tubes. Moreover fins 122, as described in more detail below, increase a surface area of the cooling tubes, which facilitates heat transfer. Each core heat exchanger 102 also includes an inlet side 118 and an outlet side 124. Each heat exchanger assembly 100 is oriented such that inlet side 118 is substantially perpendicular to the flow of bypass air 44. In the exemplary embodiment, as described in more detail below, mixer 104 extends downstream from the outlet side 124 of each core heat exchanger 102, such that mixer 104 is in flow communication with cavity 120.

In the exemplary embodiment, each pair of adjacent core heat exchangers 102 are coupled together via an inlet plenum 126. Specifically, in the exemplary embodiment, inlet plenum 126 is trapezoidal-shaped and facilitates channeling the cooling fluid through the cooling tubes coupled within heat exchanger assembly 100. Alternatively, inlet plenum 126 may have any shape that facilitates coupling the pair of core heat exchangers 102 together in any manner that enables heat exchanger assembly 100 to function as described herein. In the exemplary embodiment, each inlet plenum 126 extends circumferentially between each pair of circumferentially-spaced core heat exchangers 102 within bypass duct 38.

In the exemplary embodiment, each mixer 104 includes an inlet 140, an outlet 142, and a body 144 extending therebetween. Inlet 140 has a cross-sectional shape that is substantially the same as the cross-sectional shape of core outlet side 124. Moreover, inlet 140, in the exemplary embodiment, is coupled against outlet side 124 such that mixer 104 is in flow communication with cavity 120 to enable hot bypass air 48 discharged from core heat exchanger 102 to be channeled towards mixer outlet 142. In the exemplary embodiment, mixer outlet 142 has a cross-sectional area that is larger than the cross-sectional area of inlet 140, as described below in more detail.

Each mixer 104, in the exemplary embodiment, includes a plurality of lobes 146. Specifically, in the exemplary embodiment, each lobe 146 defines a first chute, or hot chute 148 that, as described in more detail below, channels hot bypass air 48 therethrough. In the exemplary embodiment, each pair of adjacent lobes 146 is coupled together by a second or cold chute 150. In an alternative embodiment, more than one cold chute 150 is defined between each pair of hot chutes 148. Each cold chute 150 enables cold bypass air 46 to be channeled therethrough, as described in more detail below.

In the exemplary embodiment, at least one hot chute 148 extends generally divergently from inlet 140 radially outward into the flow of cold bypass air 46, and more specifically, towards at least one of inner casing 34 and/or outer casing 32. Moreover, in the exemplary embodiment, at least one cold chute 150 is generally convergent and extends generally radially inward into the flow of hot bypass air 48, and more specifically, away from at least one of inner casing 34 and outer casing 32. As a result, a lobed or wavy mixer 104 is defined at mixer outlet 142, which as described in more detail below, facilitates entraining bypass air 44 in each core heat exchanger 102, mixing hot bypass air 48 with cold bypass air 46, and reducing the overall pressure losses of bypass air 44. In the exemplary embodiment, each mixer 104 includes eight hot chutes 148 and eight cold chutes 150. Alternatively, mixer 104 may include any number of hot chutes 148 and/or cold chutes 150.

During operation, in the exemplary embodiment, bypass air 44 is channeled generally axially through bypass duct 38 towards each heat exchanger assembly 100. Bypass air 44 is split such that a first portion is channeled through each heat exchanger assembly 100, and a second portion is channeled past each heat exchanger assembly 100. Moreover, the thermal management system transfers heat from the heat-generating systems and components of the aircraft and/or engine 10 to the cooling fluid. Specifically, the thermal management system, in the exemplary embodiment, channels the heated cooling fluid through the cooling tubes coupled within each heat exchanger assembly 100. Fins 122 facilitate increasing the surface area of the cooling tubes, which facilitates reducing a temperature of the cooling fluid channeled therein.

In the exemplary embodiment, the first portion of bypass air 44 is channeled through each heat exchanger assembly 100 to facilitate transferring heat from fins 122, and more specifically, the cooling fluid, to the first portion of bypass air 44 such that hot bypass 48 is discharged from each heat exchanger assembly 100. The second portion of bypass air 44 is channeled past each core heat exchanger 102, and more specifically, through each cold chute 150, such that cold bypass air 46 is discharged from each cold chute 150.

Hot chute 148 channels hot bypass air 48 downstream generally divergently from inlet 140 radially outward into the flow of cold bypass air 46. Moreover, cold chute 150, in the exemplary embodiment, channels cold bypass air 46 downstream generally convergent and generally radially into the flow of hot bypass air 48. The flow of cold bypass air 46 discharged from each cold chute 150 mixes with the flow of hot bypass air 48 discharged from each hot chute 148 downstream from mixer 104. As a result, temperature streaks extending downstream from heat exchanger assembly 100 are facilitated to be reduced.

In the exemplary embodiment, mixer 104 facilitates increasing the amount of bypass air 44 entrained in each heat exchanger assembly 100. Specifically, the cross-sectional area of outlet 142 of mixer 104 facilitates reducing the size of gaps 108 and 110 such that the flow of cold bypass air 46 over mixer 104 is reduced. As a result, the amount of hot bypass air 48 entrained within each core heat exchanger 102 is facilitated to be increased, which facilitates the heat transfer from the cooling fluid channeled through each heat exchanger assembly 100 to hot bypass air 48.

Mixer 104 also facilitates reducing the pressure losses of bypass air 44. In some known heat exchangers, the location of the heat exchanger causes a change in the momentum of the bypass air that results in a loss in pressure of the bypass air. Moreover, in known turbine engines, changing the direction of the flow of the bypass air to a generally circumferential and/or generally radial flow direction causes pressure losses in the bypass air. In the exemplary embodiment, mixer 104 facilitates reducing momentum changes of cold bypass air 46, which facilitates reducing the overall pressure losses of bypass air 44 channeled through bypass duct 38. In the exemplary embodiment, cold bypass air 46 is channeled past heat exchanger 100 and is channeled through cold chute 150. As a result, the flow of cold bypass air 46 is maintained in a generally axial flow direction such that pressure losses of the flow of cold bypass air 46 are facilitated to be reduced.

Figure 5:
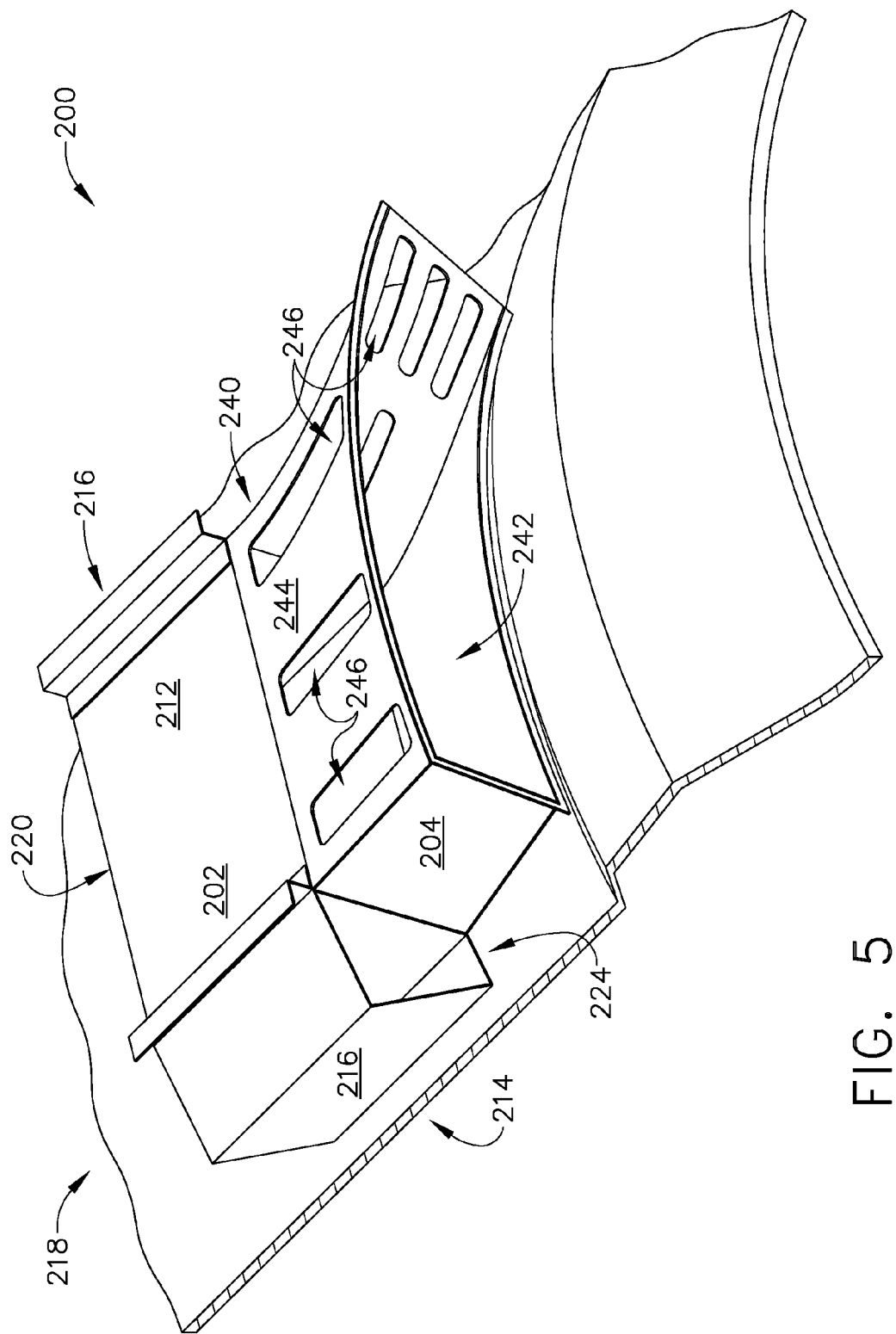
FIG. 5 is a perspective view of an alternative heat exchanger assembly that may be used with the turbine engine shown in FIG. 1.

FIG. 5 is a perspective view of an alternative heat exchanger assembly 200 that may be used with turbine engine 10. In the exemplary embodiment, each heat exchanger assembly 200 includes a core heat exchanger 202 that each includes a mixer 204 extending downstream therefrom. Alternatively, each heat exchanger assembly 200 may include more than one core heat exchanger 202. Each heat exchanger assembly 200, in the exemplary embodiment, is coupled to radially inner surface 31 of outer casing 32. As a result, each heat exchanger assembly 200 is coupled within bypass duct 38 such that core heat exchanger 202 is positioned in flow communication with the flow of bypass air 44 within bypass duct 38. Alternatively, heat exchanger assembly 200 maybe coupled to radially outer surface 35 of inner casing 34. In the exemplary embodiment, heat exchanger assembly 200 is spaced between surfaces 31 and 35 such that the radially outer gap 108 is defined between inner surface 31 and heat exchanger assembly 200, and such that the radially inner gap 110 is defined between outer surface 35 and heat exchanger assembly 200.

Bypass air 44 is channeled generally axially downstream through bypass duct 38 and past heat exchanger assembly 200. Heat exchanger assembly 200 causes bypass air 44 to be split into a first flow of bypass air and a second flow of bypass air. Specifically, in the exemplary embodiment, the first flow of bypass air, or cold bypass air 46, is channeled past heat exchanger assembly 200, and the second flow of bypass air is channeled through heat exchanger assembly 200 such that a flow of hot bypass air 48 is discharged therefrom.

In the exemplary embodiment, each heat exchanger assembly 200 is coupled in communication to a thermal management system (not shown). The thermal management system utilizes bypass air 44 as a heat sink to facilitate cooling heat-generating systems and components of an associated aircraft (not shown) and/or engine 10. Such heat-generating systems may include, but are not limited to only including, aircraft electrical systems, engine cooling systems, and/or cockpit air-conditioning systems. In the exemplary embodiment, as described in more detail below, heat exchanger assembly 200 facilitates transferring heat from a cooling fluid channeled therethrough to the flow of bypass air 44. As a result, the temperature of the cooling fluid is reduced and hot bypass air 48 is discharged from heat exchanger assembly 200.

In the exemplary embodiment, core heat exchanger 202 is substantially rectangular and includes an inner cavity 220 defined therein. Alternatively, core heat exchanger 202 may have any shape that is suitable for use within bypass duct 38. In the exemplary embodiment, core heat exchanger 202 includes a radially outer panel 212, a radially inner panel 214, and a pair of side panels 216 extending between panels 212 and 214. Panels 212, 214, and 216 are coupled together to define cavity 220 therein. Core heat exchanger 202 also includes cooling tubes (not shown) coupled within cavity 220 to channel cooling fluid therethrough. A plurality of heat transfer fins (not shown) extend substantially radially inward from inner panel 214 towards outer panel 212, wherein the fins are coupled to the cooling tubes. Moreover the fins, as described in more detail below, increase a surface area of the cooling tubes, which facilitates heat transfer. Core heat exchanger 202 also includes an inlet side 218 and an outlet side 224. Each heat exchanger assembly 200 is oriented such that inlet side 218 is substantially perpendicular to the flow of bypass air 44. In the exemplary embodiment, as described in more detail below, mixer 204 extends downstream from the outlet side 224 of each core heat exchanger 202, such that mixer 204 is in flow communication with cavity 220.

In the exemplary embodiment, mixer 204 includes an inlet 240, an outlet 242, and a body 244 extending therebetween. Inlet 240 has a cross-sectional shape that is substantially the same as the cross-sectional shape of core outlet side 224. Moreover, inlet 240, in the exemplary embodiment, is coupled against outlet side 224 such that mixer 204 is in flow communication with cavity 220 to enable hot bypass air 48 discharged from core heat exchanger 202 to be channeled towards mixer outlet 242. In the exemplary embodiment, mixer outlet 242 has a cross-sectional area that is larger than the cross-sectional area of inlet 240, as described below in more detail.

Mixer 204, in the exemplary embodiment, includes a plurality of windows 246. Specifically, in the exemplary embodiment, each window 246 defines an opening in mixer 204 that, as described in more detail below, channels cold bypass air 46 therethrough. As a result, a mixer 204 facilitates mixing hot bypass air 48 with cold bypass air 46, and reducing the overall pressure losses of bypass air 44.

During operation, in the exemplary embodiment, bypass air 44 is channeled generally axially through bypass duct 38 towards each heat exchanger assembly 200. The thermal management system transfers heat from the heat-generating systems and components of the aircraft and/or engine 10 to the cooling fluid. Specifically, the thermal management system, in the exemplary embodiment, channels the heated cooling fluid through the cooling tubes coupled within each heat exchanger assembly 200. The fins within core heat exchanger 202 facilitate increasing the surface area of the cooling tubes, which facilitates reducing a temperature of the cooling fluid channeled therein.

In the exemplary embodiment, the first portion of bypass air 44 is channeled through each heat exchanger assembly 200 to facilitate transferring heat from the fins, and more specifically, the cooling fluid, to the first portion of bypass air 44 such that hot bypass 48 is discharged from heat exchanger assembly 200. The second portion of bypass air 44 is channeled past core heat exchanger 202 and through windows 246 to facilitate increasing the amount of bypass air 44 entrained in heat exchanger assembly 200. As a result, the amount of hot bypass air 48 entrained within core heat exchanger 202 is facilitated to be increased, thereby facilitating heat transfer from the cooling fluid channeled through each heat exchanger assembly 200 to hot bypass air 48.

Mixer 204 also facilitates reducing the pressure losses of bypass air 44. In some known heat exchangers, the location of the heat exchanger causes a change in the momentum of the bypass air that results in a loss in pressure of the bypass air. Moreover, in known turbine engines, changing the direction of the flow of the bypass air to a generally circumferential and/or generally radial flow direction causes pressure losses in the bypass air. In the exemplary embodiment, mixer 204 facilitates reducing momentum changes of cold bypass air 46, which facilitates reducing the overall pressure losses of bypass air 44 channeled through bypass duct 38.

The above-described methods and apparatus facilitate entraining bypass air in at least one core heat exchanger, mixing a flow of hot bypass air with a flow of cold bypass air, and reducing the overall pressure losses of the bypass air. Specifically, each heat exchanger assembly includes a mixer that includes a plurality of lobes. Each lobe defines a first chute that is configured to channel a hot bypass airflow therethrough. A second chute is defined between each pair of adjacent spaced-apart lobes. Each second chute is configured to channel a cold bypass airflow therethrough. As a result, the flow of hot bypass air discharged from each first chute is mixed with the flow of cold bypass air discharged from each second chute. The cross-sectional area of the mixer outlet facilitates reducing gaps defined between the outer and inner casings and each heat exchanger assembly. As a result of the reduced gaps, the amount of cold bypass air channeled past each heat exchanger assembly is reduced and the amount of bypass air entrained within each heat exchanger assembly is increased. Moreover, each second chute facilitates channeling the cold bypass air in a generally axial direction such that the momentum of cold bypass air is facilitated to be maintained.

Exemplary embodiments of heat exchangers are described in detail above. The mixer described herein is not limited to use with the heat exchangers for the gas turbine engine, but rather, the mixer can be utilized independently and separately from other heat exchanger components described herein. Moreover, the invention is not limited to the embodiments of the mixers described above in detail. Rather, other variations of the mixers may be utilized within the spirit and scope of the claims.

While the invention has been described in terms of various specific embodiments, those skilled in the art will recognize that the invention can be practiced with modification within the spirit and scope of the claims.

What is claimed is:

1. A method of assembling a gas turbine engine, said method comprising:
   providing at least one heat exchanger assembly including a heat exchanger and a mixer coupled to the at least one heat exchanger and extending downstream from the heat exchanger, wherein the at least one heat exchanger includes an inlet and the mixer includes an inlet that is substantially coaxially aligned with the inlet of the at least one heat exchanger, and wherein the mixer includes a plurality of windows formed therein; and
   coupling the at least one heat exchanger assembly within a bypass duct of the engine such that a first portion of bypass air flows above and below the at least one heat exchanger assembly and mixer within the bypass duct, while a second portion of bypass air flows through the at least one heat exchanger, wherein the first and second portions of bypass air communicate at the plurality of windows of the mixer, wherein the at least one heat exchanger assembly is coupled to at least one of an outer engine casing and an inner engine casing of the turbine engine.

2. A method in accordance with claim 1 wherein providing at least one heat exchanger assembly further comprises providing a heat exchanger that includes a hollow body and a plurality of heat exchanger fins within the body.

3. A method in accordance with claim 2 further comprising coupling the mixer to the at least one heat exchanger assembly such that the mixer is in flow communication with a cavity defined within the hollow body.

4. A method in accordance with claim 2 further comprising providing the mixer including an outlet, wherein the outlet has a cross-sectional area that is larger than a cross-sectional area of the inlet of the mixer.

5. A method in accordance with claim 1 wherein coupling the at least one heat exchanger assembly further comprises orienting the at least one heat exchanger assembly within the bypass duct to facilitate reducing pressure losses within the bypass airflow.

6. A method in accordance with claim 1 further comprising coupling the mixer to the at least one heat exchanger assembly such that the inlet of the mixer is coupled to an outlet of the heat exchanger assembly.

7. A method in accordance with claim 1 further comprising coupling the mixer to the at least one heat exchanger assembly, the inlet of the mixer having a cross-sectional area that is smaller than a cross-sectional area of an outlet of the mixer.

8. A heat exchanger assembly for use in a turbine engine, said heat exchanger assembly comprising:
   at least one core heat exchanger comprising an inlet; and
   a mixer coupled to said at least one core heat exchanger within a bypass duct of the engine such that a first portion of bypass air flows above and below said at least one heat exchanger and mixer within the bypass duct, while a second portion of bypass air flows through the at least one heat exchanger, said mixer extending downstream from said at least one core heat exchanger, said mixer comprising:
      an inlet that is substantially coaxially aligned with said inlet of said at least one core heat exchanger; and a plurality of windows configured to facilitate communication of said first and second portions of bypass air.

9. A heat exchanger assembly in accordance with claim 8 wherein said at least one core heat exchanger further comprises:
   an outlet and a hollow body extending between said inlet of said at least one core heat exchanger and said outlet; and
   a plurality of heat exchanger fins that extend at least partially through said hollow body between said inlet of said at least one core heat exchanger and said outlet.

10. A heat exchanger assembly in accordance with claim 9 wherein said mixer extends from said at least one core heat exchanger outlet, such that said mixer is in flow communication with a cavity defined within said body.

11. A heat exchanger assembly in accordance with claim 8 wherein said inlet of said mixer has a first cross-sectional area, said mixer further comprises:
   an outlet having a second cross-sectional area that is larger than said first cross-sectional area; and
   a mixer body extending between said inlet of said mixer and said outlet.

12. A heat exchanger assembly in accordance with claim 8 wherein said mixer facilitates increasing an amount of air entrained within said at least one heat exchanger assembly.

13. A heat exchanger assembly in accordance with claim 11 wherein a portion of said mixer extends divergently downstream from said at least one core heat exchanger.

14. A gas turbine engine comprising:
   an outer casing, an inner casing, and a bypass duct defined therebetween, said bypass duct defining an airflow path;
   at least one heat exchanger assembly coupled within said bypass duct to at least one of said outer casing and said inner casing, said at least one heat exchanger assembly comprising:
      at least one heat exchanger comprising an inlet disposed at least partially within said airflow path; and
      a mixer coupled to said at least one heat exchanger within said bypass duct of the engine such that a first portion of bypass air flows above and below said at least one heat exchanger and mixer within said bypass duct, while a second portion of bypass air flows through said at least one heat exchanger, said mixer comprising:
         an inlet that is substantially coaxially aligned with said inlet of said at least one heat exchanger; and
         a plurality of windows configured to facilitate communication of said first and second portions of bypass air.

15. A gas turbine engine in accordance with claim 14 wherein said at least one heat exchanger assembly comprises:
   an outlet and a hollow body extending between said inlet of said at least one heat exchanger and said outlet; and
   a plurality of heat exchanger fins extending at least partially through said body between said inlet of said at least one heat exchanger and said outlet.

16. A gas turbine engine in accordance with claim 15 wherein said mixer extends downstream from said outlet and is in flow communication with a cavity defined within said body.

17. A gas turbine engine in accordance with claim 14 wherein said inlet of said mixer has a first cross-sectional area, said mixer further comprises:
   an outlet having a second cross-sectional area that is larger than said inlet cross-sectional area; and
   a hollow body extending between said inlet of said mixer and said outlet.

18. A gas turbine engine in accordance with claim 15 wherein said mixer facilitates increasing an amount of air entrained within said at least one heat exchanger assembly.

19. A gas turbine engine in accordance with claim 17 wherein a portion of said mixer extends divergently downstream from said at least one heat exchanger.

20. A gas turbine engine in accordance with claim 14 wherein said mixer facilitates reducing pressure losses downstream from said at least one heat exchanger assembly.

* * * * *